(12) United States Patent
Mallik et al.

(10) Patent No.: US 10,860,434 B2
(45) Date of Patent: Dec. 8, 2020

(54) METHOD AND SYSTEM FOR ENABLING DATA BACKUPS FOR VIRTUAL MACHINES RELIANT ON RAW DEVICE MAPPING DISKS

(71) Applicant: EMC IP Holding Company LLC, Hopkinton, MA (US)

(72) Inventors: Shubhashish Mallik, Bangalore (IN); Manish Sharma, Bangalore (IN); Shelesh Chopra, Bangalore (IN); Rintu Kumar Kanp, Bangalore (IN); Challa Dharmateja, Bangalore (IN); Krishnendu Bagchi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 124 days.

(21) Appl. No.: 15/966,690

(22) Filed: Apr. 30, 2018

(65) Prior Publication Data

US 2019/0332498 A1 Oct. 31, 2019

(51) Int. Cl.
*G06F 3/00* (2006.01)
*G06F 11/14* (2006.01)
*G06F 3/06* (2006.01)
*G06F 9/455* (2018.01)

(52) U.S. Cl.
CPC .......... *G06F 11/1464* (2013.01); *G06F 3/065* (2013.01); *G06F 3/067* (2013.01); *G06F 3/0619* (2013.01); *G06F 3/0656* (2013.01); *G06F 9/45558* (2013.01); *G06F 2201/84* (2013.01)

(58) Field of Classification Search
None
See application file for complete search history.

(56) References Cited

PUBLICATIONS

"Virtual Machine Backup Guide", ESX 4.0, ESXi 4.0 Installable and vCenter Server 4.0, VMWARE, http://www.vmware.com/support, 2007-2011, (84 pages).
European Search Report issued in corresponding EP application 19169634.3, dated Oct. 17, 2019. (9 pages).

*Primary Examiner* — Midys Rojas
(74) *Attorney, Agent, or Firm* — Chamberlain, Hrdlicka, White, Williams & Aughtry

(57) ABSTRACT

A method and system for enabling data backups for virtual machines reliant on raw data mapping (RDM) disks to store their state and/or data. Traditional virtual machine backup methodologies pivot on the generation and storage of virtual machine snapshots as copies of a virtual machine disk file, which store the state and/or data of a virtual machine at various given points in time. However, these traditional virtual machine backup methodologies, at least at present, do not support the generation and storage of virtual machine snapshots for virtual machines that particularly access and consolidate information on RDM disks. Accordingly, the method and system disclosed herein facilitate the backup of state and/or data pertaining to virtual machines reliant on RDM disks.

20 Claims, 13 Drawing Sheets

METHOD AND SYSTEM FOR ENABLING DATA BACKUPS FOR VIRTUAL MACHINES RELIANT ON RAW DEVICE MAPPING DISKS

BACKGROUND

The traditional, most followed approach for backing up virtual machines entails creating a virtual machine snapshot and rolling the virtual machine snapshot to a backup medium. For virtual machines reliant on raw device mapping disks, this traditional approach introduces some challenges as this traditional approach, at least at present, does not support the creation of virtual machine snapshots for RDM disk-reliant virtual machines.

DETAILED DESCRIPTION

Figure 1:
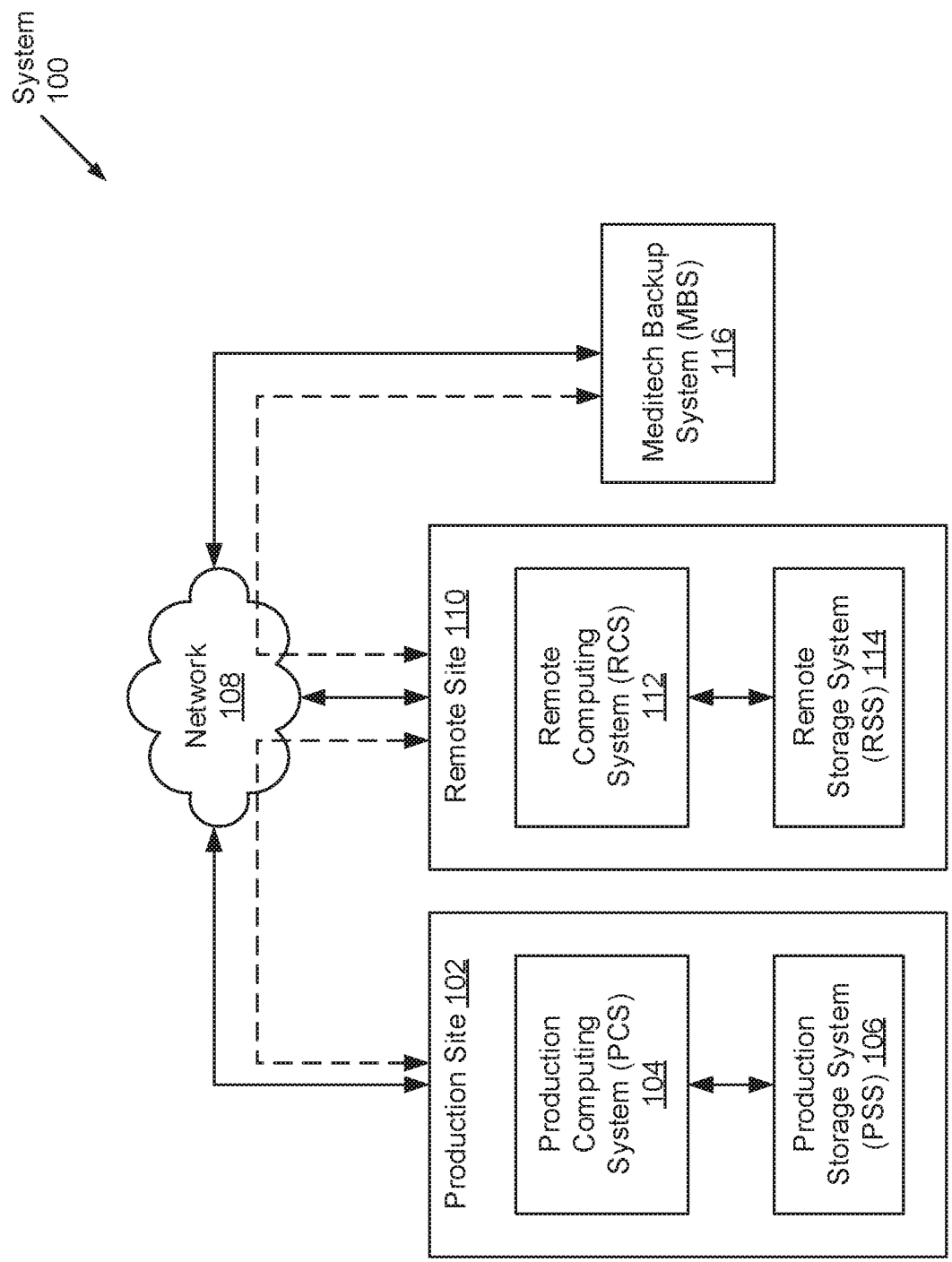
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element any noun in the application). The use of ordinal numbers is not to necessary imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for enabling data backups for virtual machines reliant on raw data mapping (RDM) disks to store their state and/or data. Specifically, one or more embodiments of the invention address an existing lack in a solution directed to the backing up RDM disk-based virtual machine state and/or data. Traditional virtual machine backup methodologies pivot on the generation and storage of virtual machine snapshots as copies of a virtual machine disk file (e.g., Virtual Machine Disk (VMDK)), which store the state and/or data of a virtual machine at various given points in time. However, these traditional virtual machine backup methodologies, at least at present, do not support the generation and storage of virtual machine snapshots for virtual machines that particularly access and consolidate information on RDM disks. Accordingly, the method and system disclosed herein facilitate the backup of state and/or data pertaining to virtual machines reliant on RDM disks, thereby alleviating the limitations and/or shortcomings of existing virtual machine backup technologies. Furthermore, the method and system disclosed herein may be performed using replica RDM disks, rather than production or source RDM disks, so as to not disturb or burden day-to-day operations, which may rely on the incessant use of the production/source RDM disks.

One or more embodiments of the invention hereinafter may be described with respect to MEDITECH virtual machines, which may refer to virtual machines configured to execute on one or more MEDITECH applications (i.e., computer programs or services provided by Medical Information Technology, Inc. (MEDITECH) of Westwood, Mass., USA). MEDITECH applications are directed to healthcare information management and, substantively, pertain to the maintenance and consolidation of patient medical information—e.g., electronic medical records (EMRs) and/or electronic health records (EHRs). However, one of ordinary skill will appreciate that the invention may be practiced for backing up virtual machine state and/or data pertinent to any virtual machine that relies on or interfaces with one or more RDM disks.

Furthermore, one or more embodiments of the invention hereinafter may be described where some or all replica disks residing on a remote site are RDM formatted disks. However, one of ordinary skill will appreciate that the invention may be practiced where some or all replica disks residing on the remote site are non-RDM formatted disks. For example, some or all replica disks residing on the remote site may encompass virtual machine disk (VMDK) formatted disks.

FIG. 1 shows a system in accordance with one or more embodiments of the invention. The system (100) may include a production site (102), a remote site (110), and a MEDITECH backup system (MBS) (116). Each of these components is described below.

In one embodiment of the invention, the above-mentioned components may be directly or indirectly connected to one another through a network (108) (e.g., a local area network (LAN), a wide area network (WAN) such as the Internet, a mobile network, etc.). The network (108) may be implemented using any combination of wired and/or wireless connections. In embodiments in which the above-mentioned components are indirectly connected, there may be other networking components and/or systems (e.g., switches, routers, gateways, etc.) that facilitate communications and/or information exchange. Further, the above-mentioned components may communicate with one another using any combination of wired and/or wireless communication protocols.

In one embodiment of the invention, the production site (102) may relate to a primary datacenter. A primary datacenter may refer to computing infrastructure whereon day-to-day operations directed to one or more usage scenarios may be executed. Computing infrastructure, in turn, may refer to a configuration of various information technology (IT) components (e.g., servers, storage, networking, management, etc.) designed to service those one or more usage scenarios. In one embodiment of the invention, the production site (102) may relate to a primary datacenter, which remains predominantly active, and thus, seldom experiences inactivity. Inactivity of the production site (102) may be caused by various reasons including, but not limited to, scheduled maintenance, unexpected power outages, and failover (e.g., due to hardware failure, data corruption, and/or software anomalies introduced through cyber security attacks or threats). In one embodiment of the invention, the production site (102) may include a production computing system (PCS) (104) operatively connected to a production storage system (PSS) (106). Each of these subcomponents is described below.

In one embodiment of the invention, the PCS (104) may be any computing system used for various purposes. For example, the PCS (104) may be used to perform large-scale and complex data processing. The PCS (104) may be implemented on one or more servers (not shown). Each server may be a physical server (i.e., within a datacenter) or a virtual server (i.e., which may be cloud based). In one embodiment of the invention, the PCS (104) may be implemented on one or more computing systems similar to the exemplary computing system shown in FIG. 7. The PCS (104) may be a computing system that provides a computing environment on which virtual machines may host one or more MEDITECH applications (described above) or any other computer applications/programs. Substantively, the PCS (104) may be any computing system capable of servicing one or more users concurrently. Further, in one embodiment of the invention, the PCS (104) may be programmed to allocate computing, storage, networking, and/or virtualization resources (e.g., processor cores, memory and storage bytes, networking bandwidth, and virtual machines) appropriately towards the execution of various processes or tasks that may be instantiated by one or more users thereon. Moreover, the PCS (104) may include functionality to: receive application programming interface (API) requests from one or more user clients (i.e., computing systems operated by one or more users) (not shown); direct the API requests to appropriate subcomponents (e.g., virtual machines) for processing; facilitate input-output (IO) communications between subcomponents and the PSS (106) or the remote site (110); and return an outcome, if any, based on at least the processing of the API requests, back to the user clients. Examples of the PCS (104) include, but are not limited to, one or more: desktop computers, laptop computers, smartphones, tablet computers, gaming consoles, servers, mainframes, or any combination thereof.

In one embodiment of the invention, the PSS (106) may be any storage array or media for consolidating various forms of data. The PSS (106) may be implemented using any type of storage unit and/or device (e.g., a filesystem, a database, a collection of tables, or any other storage mechanism). In one embodiment of the invention, the PSS (106) may be implemented using multiple storage units and/or devices, which may or may not be of the same type. Further, the PSS (106) may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-RAM), Phase Change Memory (PCM), or any other memory defined as a non-volatile Storage Class Memory (SCM). The PCS (104) and the PSS (106), which constitute the production site (102), are described in further detail below with respect to FIG. 2A.

In one embodiment of the invention, the remote site (110) may relate to a secondary or backup datacenter. A secondary/backup datacenter may refer to computing infrastructure (described above) whereon day-to-day operations, directed to one or more usage scenarios, tend not to execute unless a corresponding primary datacenter (i.e., the production site (102)) becomes inactive for any reason. That is, unlike the production site (102), the remote site (110) may remain predominantly inactive, thereby only activating for periods of time to assume responsibilities of the production site (102) when the production site (102) experiences, for example, scheduled maintenances or failover. Subsequently, in one embodiment of the invention, the remote site (110) may be a data backup, archiving, and/or disaster recovery (DR) datacenter for the production site (102). Therefore, the production site (102) and the remote site (110) may be bound by an active-passive (or active-standby) configuration. Further, in one embodiment of the invention, the remote site (110) may include a remote computing system (RCS) (112) operatively connected to a remote storage system (RSS) (114). Each of these subcomponents is described below.

In one embodiment of the invention, the RCS (112), like the PCS (104), may be any computing system used for various purposes. The RCS (112) may be implemented using one or more servers (not shown). Each server may be a physical server (i.e., within a datacenter) or a virtual server (i.e., which may be cloud-based). In one embodiment of the invention, the RCS (112) may be implemented using one or more computing systems similar to the exemplary computing system shown in FIG. 7. The RCS (112) may be a computing system that provides a computing environment on which virtual machines may host one or more MEDITECH applications (described above) or any other computer applications/programs. Further, the RCS (112) may be any computing system capable of servicing one or more users concurrently. In one embodiment of the invention, when assuming the responsibilities of the PCS (104), the RCS (112) may be programmed to allocate computing, storage, networking, and/or virtualization resources (e.g., processor cores, memory and storage bytes, networking bandwidth, and virtual machines) appropriately towards the execution of various processes or tasks that may be instantiated by one or more users thereon. Moreover, the RCS (112) may include functionality to: receive application programming interface (API) requests from one or more user clients (i.e., computing systems operated by one or more users) (not shown); direct the API requests to appropriate subcomponents (e.g., virtual machines) for processing; facilitate input-output (IO) communications between subcomponents and the RSS (114) or the production site (102); and return an outcome, if any, based on at least the processing of the API requests, back to the user clients. Examples of the RCS (112) include, but are not limited to, one or more: desktop computers, laptop computers, smartphones, tablet computers, gaming consoles, servers, mainframes, or any combination thereof.

In one embodiment of the invention, the RSS (114), like the PSS (106), may be any storage array or media for consolidating various forms of data. The RSS (114) may be implemented using any type of storage unit and/or device (e.g., a filesystem, a database, a collection of tables, or any other storage mechanism). In one embodiment of the invention, the RSS (114) may be implemented using multiple storage units and/or devices, which may or may not be of the same type. Further, the RSS (114) may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-RAM), Phase Change Memory (PCM), or any other memory defined as a non-volatile Storage Class Memory (SCM). The RCS (112) and RSS (114), which constitute the remote site (110), are described in further detail below with respect to FIG. 2B.

In one embodiment of the invention, the remote site (110) may reside in one or more different physical locations than the physical location(s) within which the production site (102) may reside. This geographic distribution of components may be a tactic for mitigating the effects of unexpected power outages and cyber security attack/threat intrusions that may be inflicted on any one particular physical location. Further, in one embodiment of the invention, the RCS (112) and/or RSS (114) may specify the same or different configuration of resources (e.g., compute, storage, and/or network resources) as that which may be specified on the PCS (104) and/or PSS (106).

In one embodiment of the invention, the remote site (110) may retain the exact same information (e.g., virtual machine state, virtual machine data, etc.) that may be also be stored on the production site (102) at any given time. Synchronization of information between the production site (102) and the remote site (110) may be facilitated by any one or more existing data synchronization mechanisms and/or protocols. By way of an example, the production site (102) and the remote site (110) may include functionality to communicate with one another through Fibre Channel (FC) and/or Internet Protocol (IP) connectivity. Furthermore, in one embodiment of the invention, the production site (102) and the remote site (110) may synchronize information with one another regularly or periodically. Information synchronization may, for example, take form as exchanges of snapshots encompassing virtual machine writes to respective RDM disks (described below).

In one embodiment of the invention, the MBS (116) may be a third-party data backup, archiving, and/or disaster recovery (DR) storage system. The MBS (116) may be implemented on one or more servers (not shown). Each server may be a physical server (i.e., within a datacenter) or a virtual server (i.e., which may be cloud-based). In one embodiment of the invention, the MBS (116) may be implemented on one or more computing systems similar to the exemplary computing system shown in FIG. 7. Further, the MBS (116) may include functionality to: receive replicated virtual machine state and/or data, pertaining to virtual machines reliant on RDM disks, from the remote site (110); store the received replicated virtual machine state/data; and issue acknowledgements of the received information back to the remote site (110). Moreover, as a storage system, the MBS (116) may additionally be implemented using any type of storage unit and/or device (e.g., a filesystem, a database, a collection of tables, or any other storage mechanism). In one embodiment of the invention, the MBS (116) may be implemented using multiple storage units and/or devices, which may or may not be of the same type or located at the same physical site. Further, the MBS (116) may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-RAM), Phase Change Memory (PCM), or any other memory defined as a non-volatile Storage Class Memory (SCM).

While FIG. 1 shows a configuration of components, other system configurations may be used without departing from the scope of the invention. For example, the system (100) may include additional remote sites (110) to further mitigate failover and/or disaster recovery events.

Figure 2A:
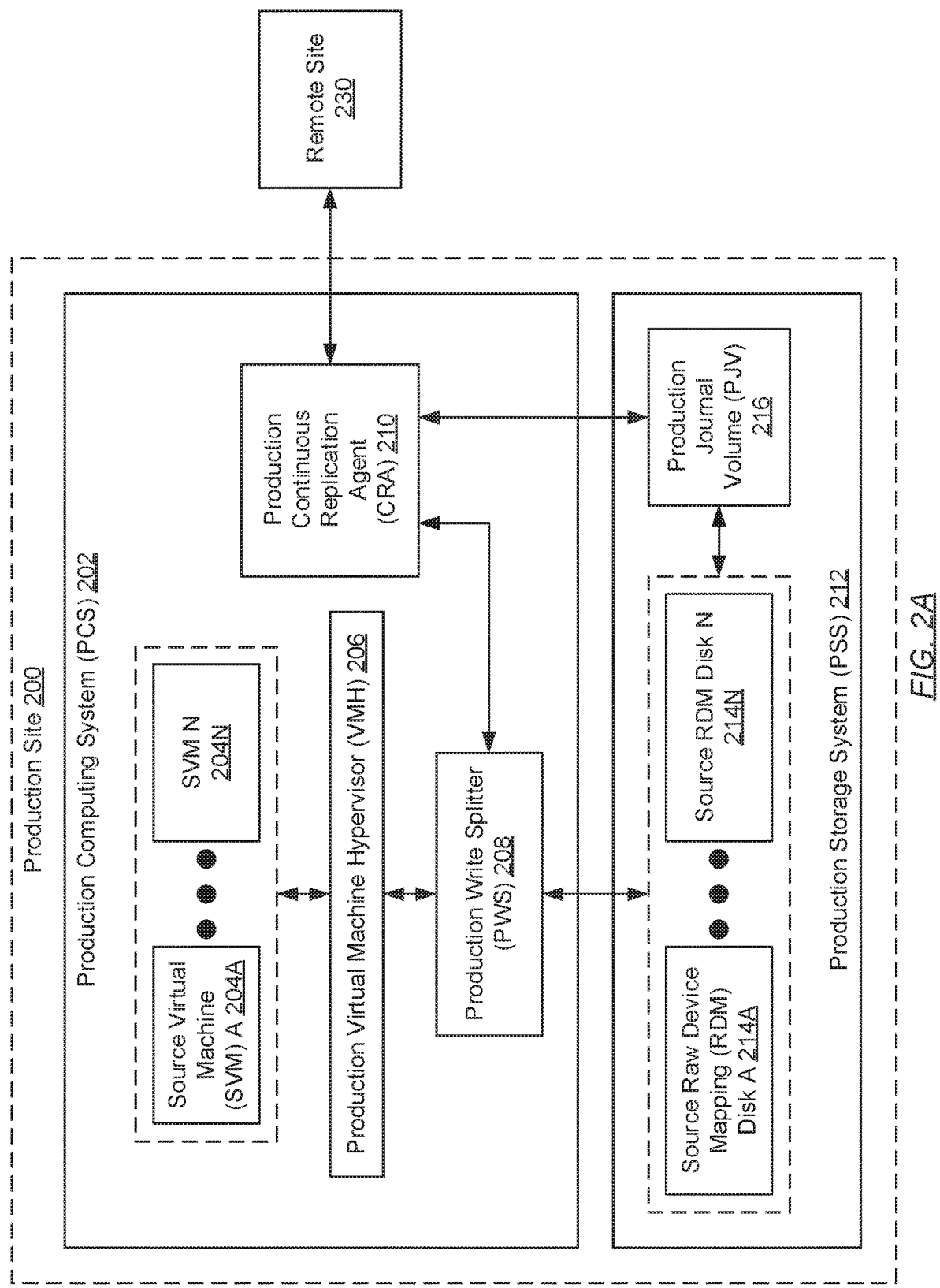
FIG. 2A shows a production site in accordance with one Or more embodiments of the invention.

FIG. 2A shows a production site in accordance with one or more embodiments of the invention. As described above, the production site (200) may include a production computing system (PCS) (202), which may be any computing system used for various purposes. The PCS (202) may include one or more source virtual machines (SVMs) (204A-204N), a production virtual machine hypervisor (VMH) (206), a production write splitter (PWS) (208), and a production continuous replication agent (CRA) (210). Each of these components is described below.

In one embodiment of the invention, a SVM (204A-204N) may refer to a primary or production virtual machine. Generally, a SVM (204A-204N) may be a computer program that executes on the underlying hardware of a host (i.e., the PCS (202)). Specifically, a SVM (204A-204N) may be a computer program that emulates a physical computing system (see e.g., FIG. 7) and, thus, provides a self-contained execution environment on which other operating systems (OSs) (that may be distinct from the host OS) and other computer programs may execute. In one embodiment of the invention, each SVM (204A-204N) may include functionality to, via the production VMH (206), write to and read from one or more source raw device mapping (RDM) disks (214A-214N) (described below) residing on the production storage system (PSS) (212).

In one embodiment of the invention, the production VMH (206) may be a computer program or process (i.e., an instance of a computer program) that executes on the underlying hardware of the PCS (202). Specifically, the production VMH (206) may be a computer program/process tasked with managing the one or more SVMs (204A-204N), which may also be executing on the PCS (202). Therefore, the production VMH (206) may include functionality to: create or delete any SVM (204A-204N); allocate or deallocate host (i.e., PCS (202)) resources to support the execution of one or more SVMs (204A-204N) and their respective workloads (e.g., guest OSs, applications, etc.); and maintain intra-site communication between the one or more SVMs (204A-204N) and other production site (200) components (e.g., the PWS (208), the production CRA (210), and the PSS (212)). One of ordinary skill will appreciate that the production VMH (206) may perform other functionalities without departing from the scope of the invention.

In one embodiment of the invention, the PWS (208) may be a computer program or process (i.e., an instance of a computer program) that executes on the underlying hardware of the PCS (202). Specifically, the PWS (208) may be a computer program/process tasked with splitting or duplicating input-output (IO) writes from one or more SVMs (204A-204N), via the production VMH (206), towards one or more source RDM disks (214A-214N). In splitting or duplicating a write, the PWS (208) may generate a write copy—i.e., an exact copy/duplicate of the write—which the PWS (208) subsequently routes to the production CRA (210). In the meantime, the original write may be forwarded, along its original, intended pathway, to the PSS (212).

In one embodiment of the invention, the production CRA (210) may be a physical or virtualized appliance (i.e., a physical device or a computer program) tasked with managing aspects pertaining to data protection and replication for data residing at the production site (200). Further, the production CRA (210) may enable data backup and/or archiving capabilities for disaster recovery purposes. To that end, the production CRA (210) may include functionality to share replicated information of production site (200) data to a remote site (230) for redundant storage and/or retrieval. Moreover, the production CRA (210) may include functionality to perform some or all steps outlined in FIGS. 4A-4C, which pertain to the protection of replication sets (described below) in accordance with one or more embodiments of the invention. By way of an example, the production CRA (210) may be a RecoverPoint for Virtual Machines (RP4VM) appliance manufactured by Dell EMC of Hopkinton, Mass., USA.

In one embodiment of the invention, the production site (200) may further include a PSS (212), which may be operatively connected to the PCS (202). As described above, the PSS (212) may be any storage array or media for consolidating various forms of data. The PSS (212) may include one or more source RDM disks (214A-214N) and a production journal volume (PJV) (216). Each of these components is described below.

In one embodiment of the invention, a source RDM disk (214A-214N) may relate to a primary or production RDM disk, which may store original copies or versions of data pertinent to one or more SVMs (204A-204N). Specifically, a source RDM disk (214A-214N) may consolidate point-in-time history of data associated with (i.e., generated and/or used by) at least the one or more SVMs (2014A_2014N). Furthermore, in general, a RDM disk may be a physical storage device (e.g., a hard disk drive (HDD), a solid state drive (SSD), etc.), which employs a RDM mechanism for enabling disk access by a virtual machine (i.e., one or more SVMs (204A-204N)). The RDM mechanism may pertain to providing virtual machines direct access to a storage logical unit number (LUN). A storage LUN may be a logical abstraction or virtualization layer between a physical storage device (e.g., the source RDM disk(s) (214A-214N)) and the computer programs/applications (e.g., SVMs (204A-204N)) that wish to access it. Further, a storage LUN may be formatted with any filesystem (e.g., New Technology File System (NITS), File Allocation Table (FAT), etc.), which may remove the need for creating a Virtual Machine File System (VMFS) data store and, subsequently, storing a Virtual Machine Disk (VMDK) on a storage LUN.

In one embodiment of the invention, towards interacting with a source RDM disk (214A-214N), a mapping file may be created, which may subsequently be referenced in/from a configuration file for a SVM (204A-204N). The flapping file may point to the storage LUN associated with the source RDM disk (214A-214N). Further, the mapping file may act as a proxy for the source RDM disk (214A-214N) and substantively includes metadata that may be used for managing and redirecting access to the source RDM disk (214A-214N). More specifically, when interacting with a source RDM disk (214A-214N), a SVM (204A-204N) may read the mapping file and, subsequently, submit read and/or write requests directly to the storage LUN for the source RDM disk (214A-214N).

In one embodiment of the invention, the PJV (216) may refer to one or more physical storage devices that consolidate virtual machine snapshots that may be awaiting distribution to the remote site (230). The PJV (216) may also consolidate virtual machine snapshots that may have already been distributed to the remote site (230). In one embodiment of the invention, a virtual machine snapshot may refer to an exact copy of any granularity of state and/or data pertaining to a virtual machine (i.e., a SVM (204A-2014N)). In one embodiment of the invention, the PJV (216) may only be exposed to the production CRA (210) and not the host (i.e., the PCS (202)). The PJV (216), and journal volumes in general, are described in further detail below with respect to FIG. 3B.

Figure 2B:
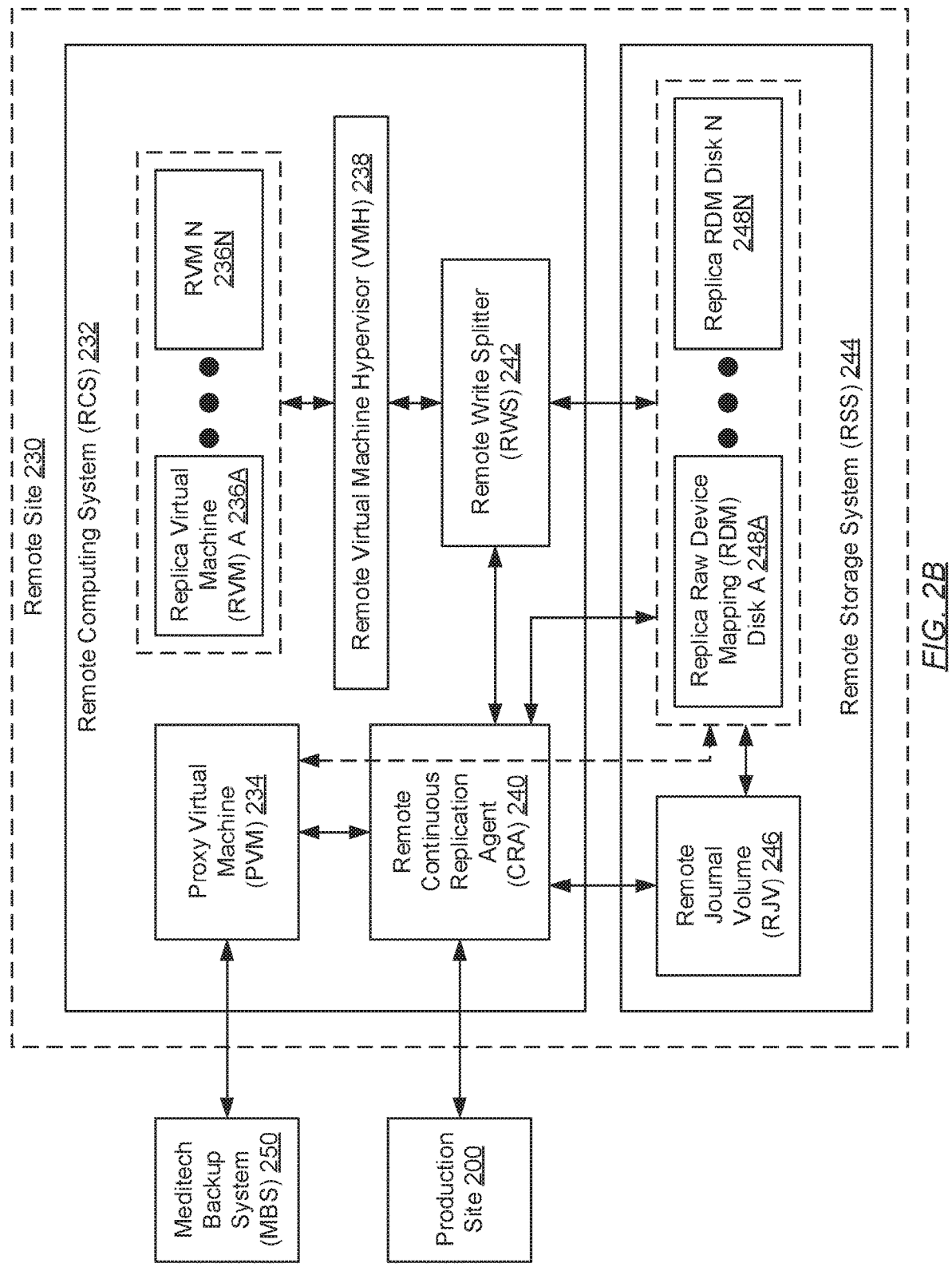
FIG. 2B shows a remote site in accordance with one or more embodiments of the invention.

FIG. 2B shows a remote site in accordance with one or more embodiments of the invention. As described above, the remote site (230) may include a remote computing system (RCS) (232), which may be any computing system used for various purposes. The RCS (232) may include a proxy virtual machine (PVM) (234), one or more replica virtual machines (RVMs) (236A-236N), a remote virtual machine hypervisor (VMH) (238), a remote continuous replication agent (CRA) (240), and a remote write splitter (RWS) (242). Each of these components is described below.

In one embodiment of the invention, the PVM (234) may be a computer program or process (i.e., an instance of a computer program) tasked with backing up virtual machine snapshots (described above) to a third-party storage system. By way of an example, the third-party storage system may be a MEDITECH backup system (MBS) (250), which is also portrayed and described in FIG. 1. More specifically, the PVM (234) may include functionality to: replicate logical volumes, representative of restored virtual machine snapshots, which may have been attached to the PVM (234) to perform backup operations; obtain replicated logical volumes through the replication of logical volumes; and transmit, via a network, any replicated logical volumes towards the third-party storage system for further redundant storage and disaster recovery purposes.

In one embodiment of the invention, a RVM (236A-236N) may refer to a secondary or backup virtual machine, which may correspond to a SVM (not shown) executing on the PCS (not shown) of the production site (200). Generally, a RVM (236A-236N) may be a computer program that executes on the underlying hardware of a host (i.e., the RCS (232)). Specifically, a RVM (236A-236N) may be a computer program that emulates a physical computing system (see e.g., FIG. 7) and, thus, provides a self-contained execution environment on which other operating systems (OSs) (that may be distinct from the host OS) and other computer programs may execute. In one embodiment of the invention, each RVM (236A-236N) may include functionality to, via the remote VMH (238), write to and read from one or more replica raw device mapping (RDM) disks (248A-248N) (described below) residing on the remote storage system (RSS) (244).

In one embodiment of the invention, the remote VMH (238) may be a computer program or process (i.e., an instance of a computer program) that executes on the underlying hardware of the RCS (232). Specifically, the remote VMH (238) may be a computer program/process tasked with managing the one or more RVMs (236A-236N), which may also be executing on the RCS (232). Therefore, the remote VMH (238) may include functionality to: create or delete any RVM (236A-236N); allocate or deallocate host (i.e., RCS (232)) resources to support the execution of one or more RVMs (236A-236N) and their respective workloads (e.g., guest OSs, applications, etc.); and maintain intra-site communication between the one or more RVMs (236A-236N) and other remote site (230) components (e.g., the MS (242), the remote CRA (240), and the RSS (244)). One of ordinary skill will appreciate that the remote VMH (238) may perform other functionalities without departing from the scope of the invention.

In one embodiment of the invention, the RWS (242) may be a computer program or process (i.e., an instance of a computer program) that executes on the underlying hardware of the RCS (232). Specifically, the RWS (242) may be a computer program/process tasked with splitting or duplicating input-output (IO) writes from one or more RVMs (236A-236N), via the remote VMH (238), towards one or more replica RDM disks (248A-248N). In splitting or duplicating a write, the RWS (242) may generate a write copy—i.e., an exact copy/duplicate of the write—which the RWS (242) subsequently routes to the remote CRA (240). In the meantime, the original write may be forwarded, along its original, intended pathway, to the RSS (244).

In one embodiment of the invention, the remote CRA (210) may be a physical or virtualized appliance (i.e., a physical device or a computer program) tasked with managing aspects pertaining to data protection and replication for data residing at the production site (200) and/or the remote site (230). Further, the remote CRA (240) may enable data backup and/or archiving capabilities for disaster recovery purposes. To that end, the remote CRA (210) may include functionality to manage shared, replicated information from the production site (200). The remote CRA (210), when the remote site (230) is assuming the responsibilities of the production site (200) during production site (200) failover, may share replicated information of the remote site (230) to another remote site (230) for redundant storage and/or retrieval. Moreover, the remote CRA (230) may include functionality to perform some or all steps outlined in FIGS. 5A-6B, which pertain to the protection of replication sets (described below) and the enablement of data backups for virtual machines reliant on RDM disks in accordance with one or more embodiments of the invention. By way of an example, the remote CRA (210) may be a RecoverPoint for Virtual Machines (RP4VM) appliance manufactured by Dell EMC of Hopkinton, Mass., USA.

In one embodiment of the invention, the remote site (230) may further include a RSS (244), which may be operatively connected to the RCS (232). As described above, the RSS (244) may be any storage array or media for consolidating various forms of data. The RSS (244) may include one or more replica RDM disks (248A-248N) and a remote journal volume (RJV) (246). Each of these components is described below.

In one embodiment of the invention, a replica RDM disk (248A-248N) may relate to a secondary or backup RDM disk, which may store replicated copies or versions of data pertinent to one or more SVMs (not shown as well as original copies or versions of data pertinent to one or more RVMs (236A-236N). Specifically, a replica RDM disk (248A-248N) may consolidate point-in-time history of data associated with (i.e., generated and/or used by) at least the one or more SVMs and/or RVMs (236A-236N). Furthermore, in general, a RDM disk may be a physical storage device (e.g., a hard disk drive (HDD), a solid state drive (SSD), etc.), which employs a RDM mechanism for enabling disk access by a virtual machine (i.e., one or more RVMs (236A-236N)). The RDM mechanism may pertain to providing virtual machines direct access to a storage logical unit number (LUN). A storage LUN may be a logical abstraction or virtualization layer between a physical storage device (e.g., the replica RDM disk(s) (248A-248N)) and the computer programs/applications (e.g., RVMs (236A-236N)) that wish to access it. Further, a storage LUN may be formatted with any filesystem (e.g., New Technology File System (NTFS), File Allocation Table (FAT), etc.), which may remove the need for creating a Virtual Machine File System (VMFS) data store and, subsequently, storing a Virtual Machine Disk (VMDK) on a storage LUN.

In one embodiment of the invention, towards interacting with a replica RDM disk (248A-248N), a mapping file may be created, which may subsequently be referenced in/from a configuration file for a RVM (236A-236N). The mapping file may point to the storage LUN associated with the replica RDM disk (248A-248N). Further, the mapping file may act as a proxy for the replica RDM disk (248A-248N) and substantively includes metadata that may be used for managing and redirecting access to the replica RDM disk (248A-248N). More specifically, when interacting with a replica RDM disk (248A-248N), a RVM (236A-236N) may read the mapping file and, subsequently, submit read and/or write requests directly to the storage LUN for the replica RDM disk (248A-248N).

In one embodiment of the invention, the RJV (246) may refer to one or more physical storage devices that consolidate virtual machine snapshots that may be awaiting distribution to a replica RDM disk (248A-248N). The RJV (246) may also consolidate virtual machine snapshots that may have already been distributed to a replica RDM disk (248A-248N). In one embodiment of the invention, a virtual machine snapshot may refer to an exact copy of any granularity of state and/or data pertaining to a virtual machine (i.e., a SVM (not shown) and/or a RVM (236A-236N)). In one embodiment of the invention, the RJV (246) may only be exposed to the remote CRA (240) and not the host (i.e., the RCS (232)). The RJV (246), and journal volumes in general, are described in further detail below with respect to FIG. 3B.

Figure 3A:
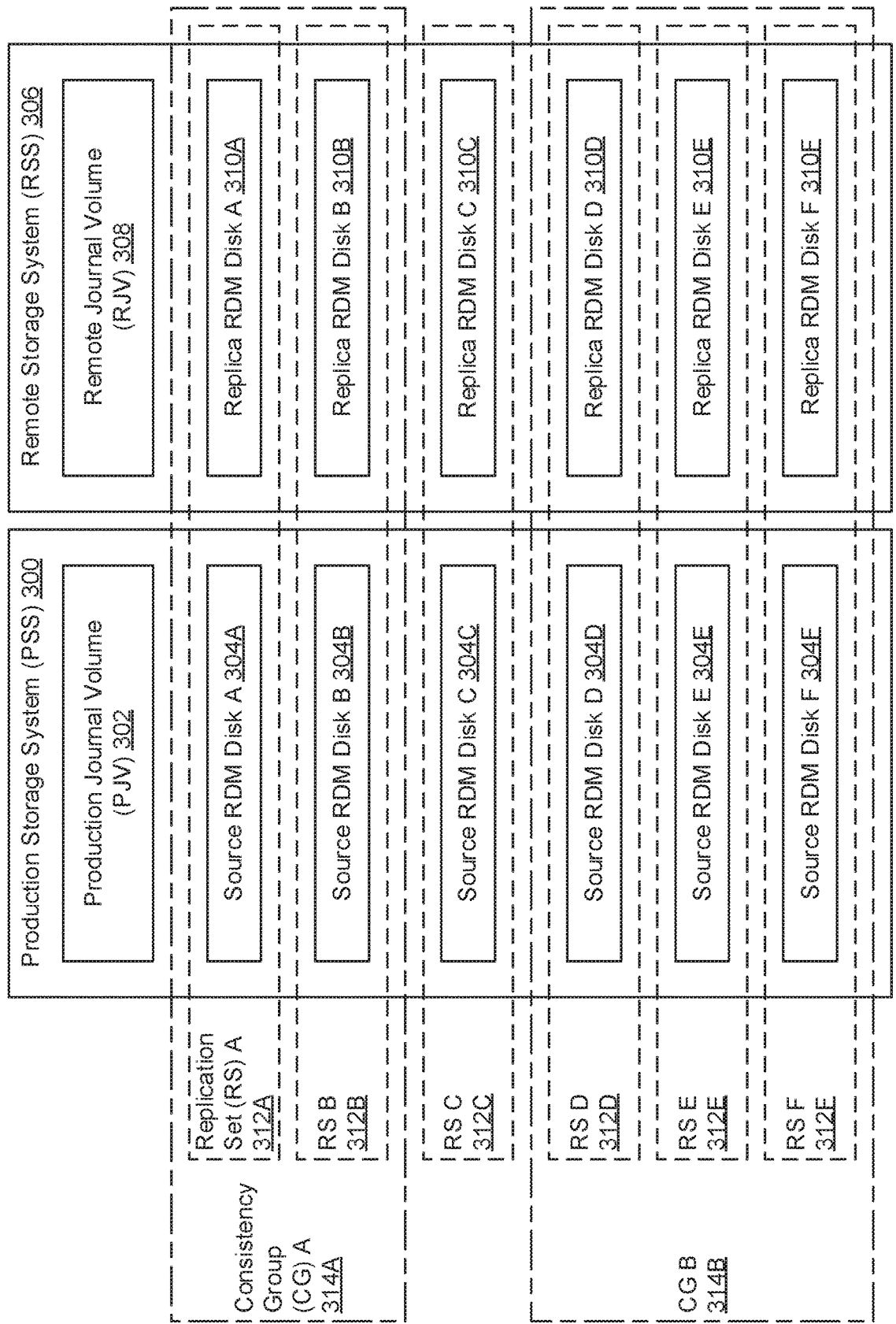
FIG. 3A shows replication sets and consistency groups in accordance with one or more embodiments of the invention.

FIG. 3A shows replication sets and consistency groups in accordance with one or more embodiments of the invention. A replication set (RS) (312A-312F) may be a logical grouping of physical storage devices. Further, a RS (312A-312F) may include a production site physical storage device and a corresponding remote site physical storage device. For example, RS A (312) may logically group a production (or source) raw data mapping (RDM) disk A (304A), which may reside in a production storage system (PSS) (300), and a corresponding remote (or replica) RDM disk A (310A), which may reside in a remote storage system (RSS) (306). On the other hand, a consistency group (CG) (314A, 3114B) may be a logical grouping of one or more RSs (312A-312F), which have been selected for data protection. Data protection may refer to data replication and remote distribution for disaster recovery purposes. For example, CG A (314A) may logically group RS A (312A) and RS B (312B) together, whereas CG B (314B) may logically group RS D (312D), RS E (312E), and RS F (312F) together. In one embodiment of the invention, each CG (314A, 314B) may ensure write order consistency across all RSs (312A-312F) designated into the CG (314A, 314B). That is, writes submitted/performed to a remote/replica RDM disk (310A-310F) of a RS (312A-312F) are sorted in the same order in which the writes were submitted/performed to the corresponding production/source RDM disk (308A-308F) of the RS (312A-312F).

Figure 3B:
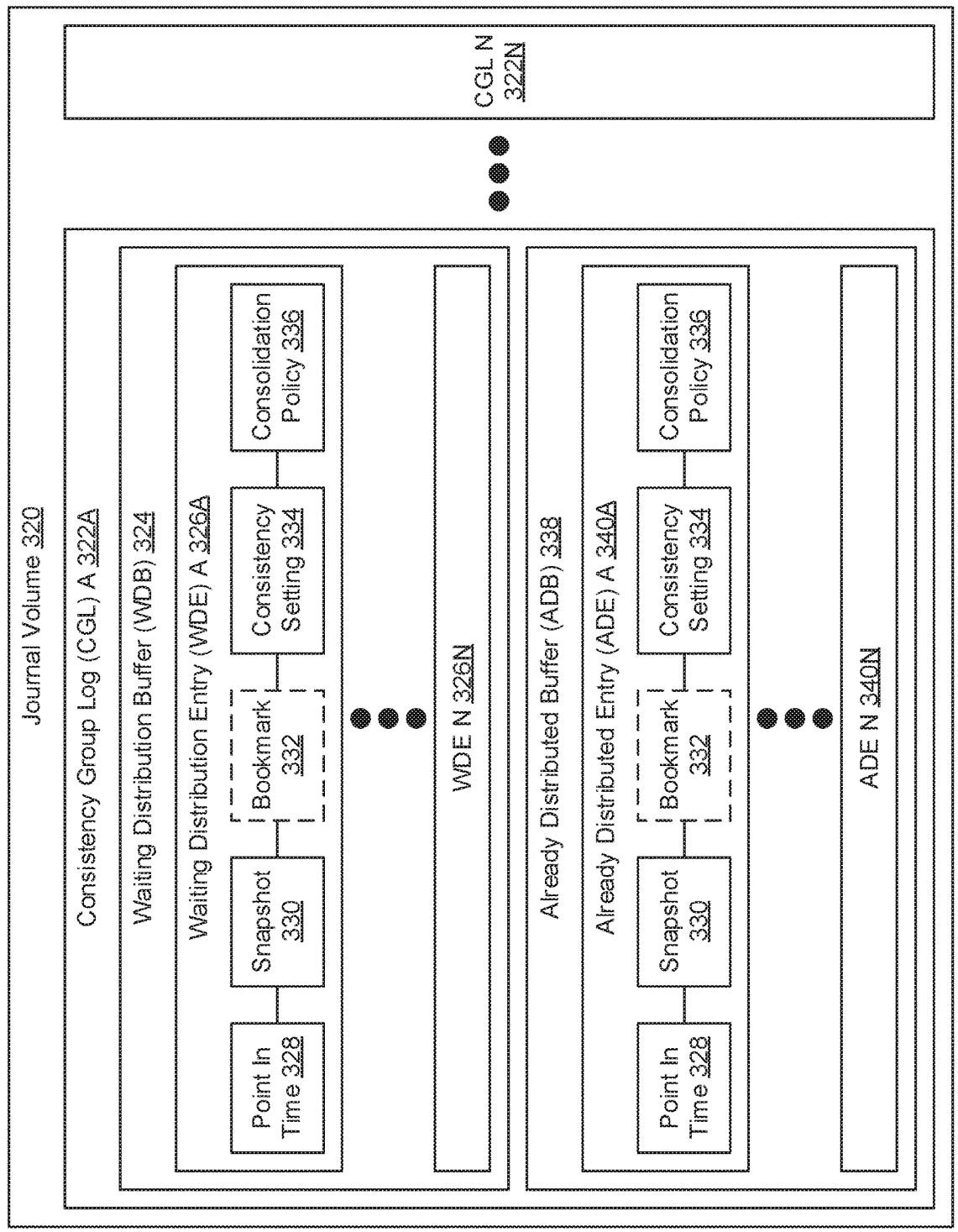
FIG. 3B shows a journal volume in accordance with one or more embodiments of the invention.

FIG. 3B shows a journal volume in accordance with one or more embodiments of the invention. As described above, a journal volume (320) may encompass one or more physical storage devices that collectively consolidate point-in-time histories of virtual machine state and/or data, which may otherwise be disclosed herein as virtual machine snapshots. A journal volume (320) may, more specifically, include one or more consistency group logs (CGLs) (322A-322N). Each CGL (322A-322N) may be a record accounting for all virtual machine snapshots, pertaining to a consistency group (described above), that may be awaiting distribution and/or already have been distributed. Accordingly, each CGL (322A-322N) may include a waiting distribution buffer (WDB) (324) and an already distributed buffer (ADB) (338). Each of these components is described below.

In one embodiment of the invention, a WDB (324) may be a data structure that resembles a first in, first out (FIFO) queue. That is, per the FIFO mechanism, elements (i.e., entries) exit the WDB (324) in the order in which they entered the WDB (324). Further, an element or entry may enqueue (i.e., enter) through a top, back, or tail of the WDB (324) and, subsequently, dequeue (i.e., exit) through a bottom, front, or head of the WDB (324). In one embodiment of the invention, a WDB (324) may be a data structure that buffers one or more waiting distribution entries (WDEs) (326A-326N). Each WDE (326A-326N) may pertain to a virtual machine snapshot that may be awaiting distribution to a remote site (i.e., in the case of the production journal volume) or a replica RDM disk (i.e., in the case of the remote journal volume). Moreover, each WDE (326A-326N) may include a point-in-time (328), a virtual machine snapshot (330), a bookmark (332) (optionally), a consistency setting (334), and a consolidation policy (336). Each of these items is described below.

In one embodiment of the invention, the point-in-time (328) may refer to a timestamp or encoded information that identifies when—i.e., pertaining to a specific date and time—the virtual machine snapshot (330) had been generated. The virtual machine snapshot (330) may refer to a full or differential image (i.e., an exact copy) of state and/or data associated with a virtual machine (e.g., a source virtual machine or a replica virtual machine). Furthermore, a bookmark (332) may be a label that may be applied to the virtual machine snapshot (330). The bookmark (332) enables the virtual machine snapshot (330) to be explicitly referenced during data recovery operations. In one embodiment of the invention, the bookmark (332) may be generated manually by an administrator of a production site and/or remote site. In another embodiment of the invention, the bookmark (332) may be generated automatically by the production or remote continuous replication agent (CRA) (see e.g., FIGS. 2A and 2B) at predefined intervals or in response to specific system events.

In one embodiment of the invention, the consistency setting (334) may refer to the state of data consistency associated with the virtual machine snapshot (330). By way of an example, the consistency setting (334) may indicate that the virtual machine snapshot (330) is crash-consistent. Being crash-consistent, the virtual machine snapshot (330) captures all differential or full virtual machine state and/or data at the designated point-in-time (328). By way of another example, the consistency setting (334) may indicate that the virtual machine snapshot (330) is application-consistent. Being application-consistent, the virtual machine snapshot (330) not only captures all differential/full virtual machine state and/or data, but also captures all in-memory data and in-process transactions (i.e., IO requests) at the designated point-in-time (328).

In one embodiment of the invention, the consolidation policy (336) may refer to a frequency in which the virtual machine snapshot (330) may be consolidated. Specifically, the consolidation policy (336) may pertain to frequency in which the virtual machine snapshot (330) may be distributed to the remote site (in the case of a production journal volume) or to a replica RDM disk (in the case of a remote journal volume). By way of examples, the consolidation policy (336) may specify that the virtual machine snapshot (330): (a) is never to be consolidated; (b) is to be consolidated daily; (c) is to be consolidated weekly; (d) is to be consolidated monthly; or (e) is to be consolidated indefinitely.

In one embodiment of the invention, an ADB (338) may be a data structure that resembles a first in, first out (FIFO) queue. That is, per the FIFO mechanism, elements entries) exit the ADB (338) in the order in which they entered the ADB (338). Further, an element or entry may enqueue (i.e., enter) through a top, back, or tail of the ADB (338) and, subsequently, dequeue (i.e., exit) through a bottom, front, or head of the ADB (338), In one embodiment of the invention, a ADB (338) may be a data structure that buffers one or more already distributed entries (ADEs) (340A-340N). Each ADE (340A-340N) may pertain to a virtual machine snapshot that may have already been distributed to a remote site (i.e., in the case of the production journal volume) or a replica RDM disk (i.e., in the case of the remote journal volume). Moreover, each ADE (340A-340N) may include a point-in-time (328), a virtual machine snapshot (330), a bookmark (332) (optionally), a consistency setting (334), and a consolidation policy (336). Each of these components have been described above with respect to WDEs (326A-326N). In one embodiment of the invention, a WDE (326A-326N) may be repurposed as an ADE (340A-340N) after the associated virtual machine snapshot (330) has been distributed to a remote site or a replica RDM disk.

Figure 4A:
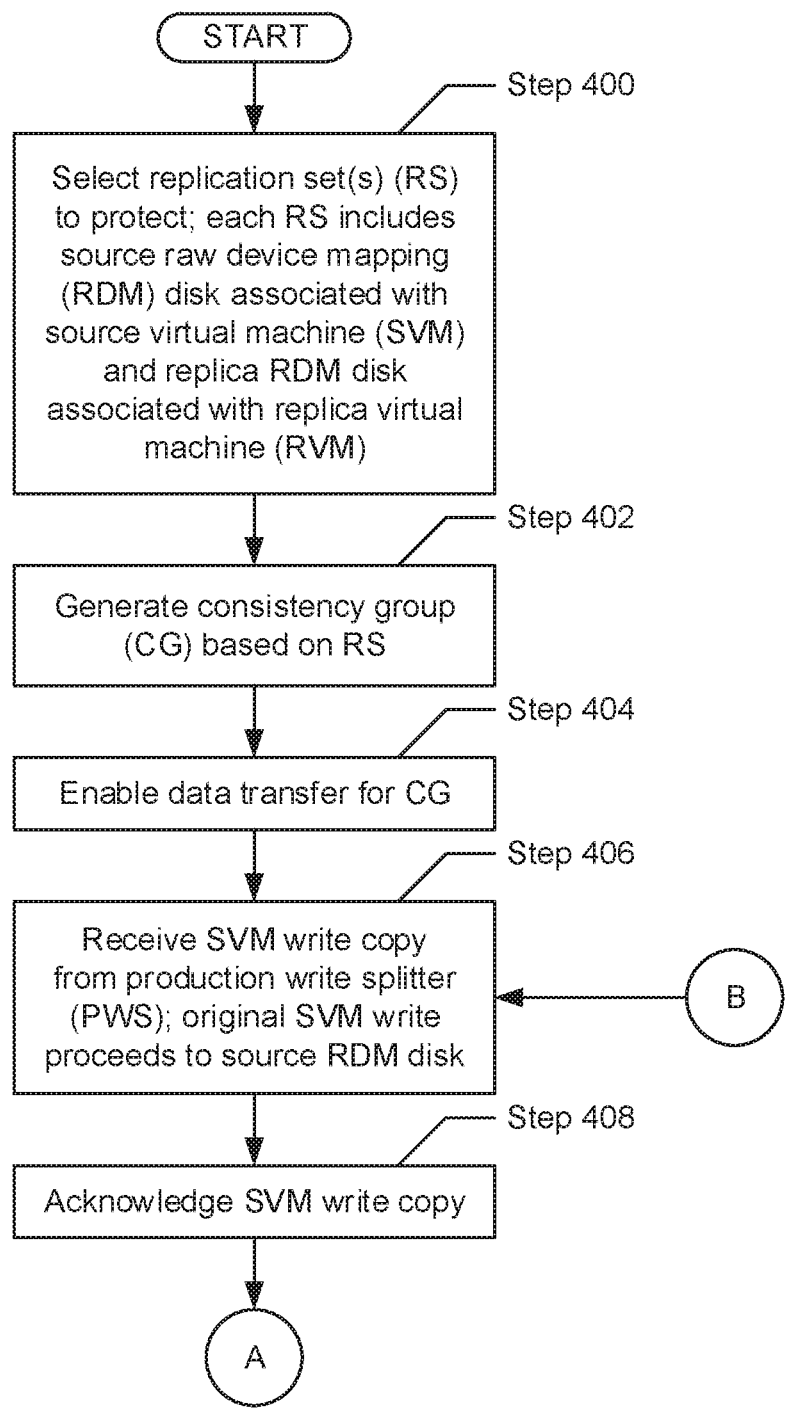
FIGS. 4A-4C show flowcharts describing a method for protecting replication sets in accordance with one or more embodiments of the invention.
Figure 4B:
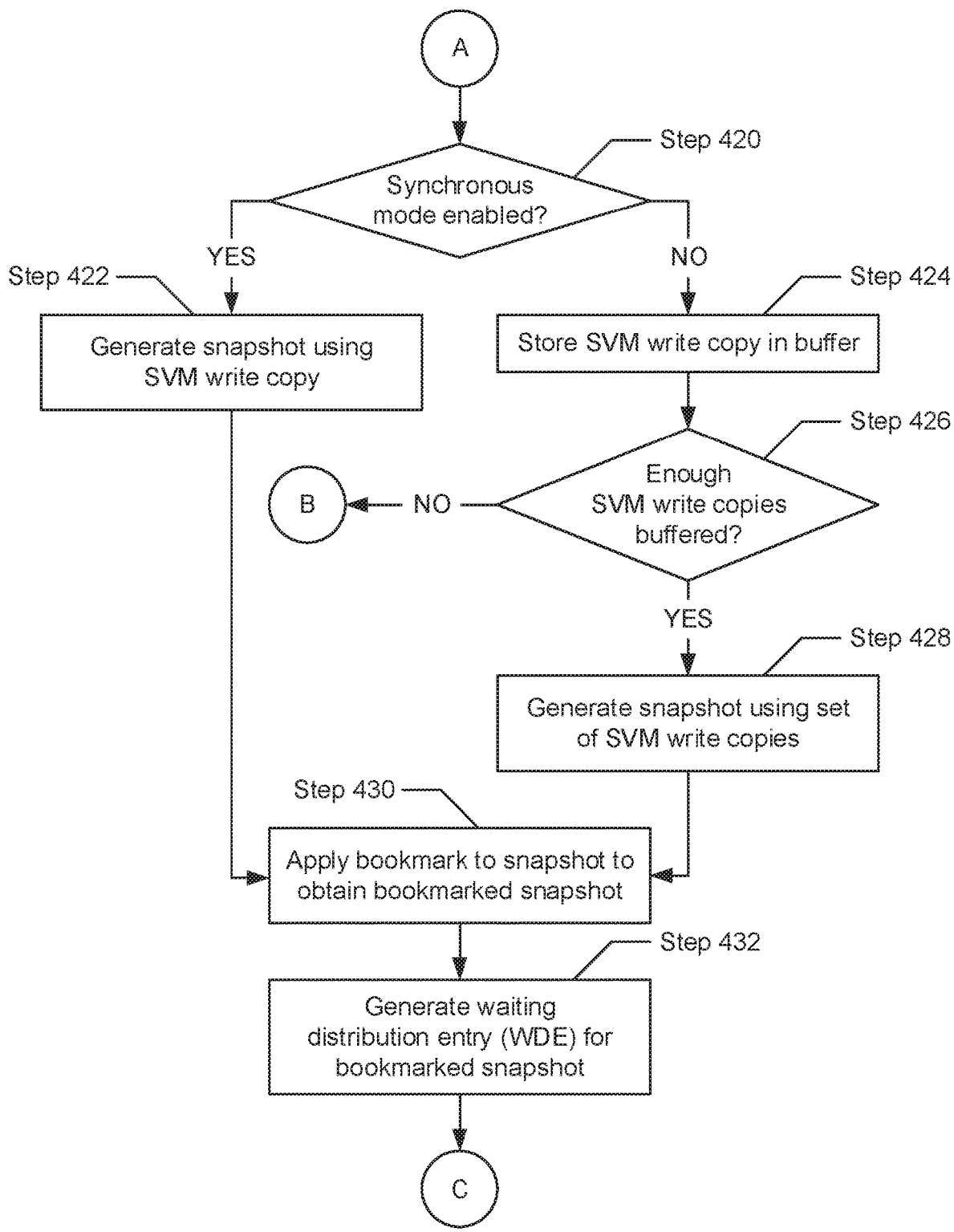
Figure 4C:
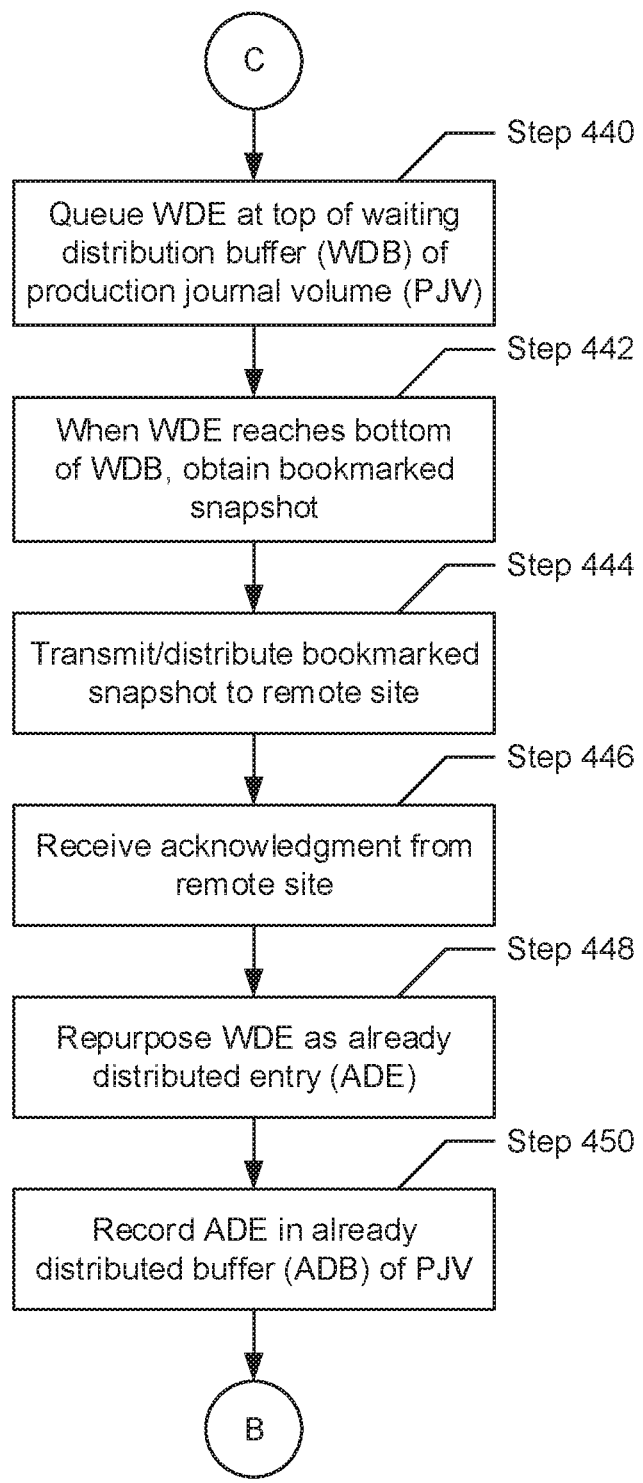

FIGS. 4A-4C show flowcharts describing a method for protecting replication sets in accordance with one or more embodiments of the invention. The various steps outlined in FIGS. 4A-4C pertain to the perspective of the production site. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIGS. 4A-4C may be performed in parallel with any other steps shown in FIGS. 5A-6B without departing from the scope of the invention.

Turning to FIG. 4A, in Step 400, one or more replication sets (RSs) is/are selected for data protection. In one embodiment of the invention, each RS may include a source raw device mapping (RDM) disk that resides at a production site, and a corresponding replica RUM disk that resides at a remote site. Further, the source RDM disk may be associated with at least one source virtual machine (SVM), which may also reside at the production site. On the other hand, the replica RDM disk may be associated with at least one replica virtual machine (RVM), which may also reside at the remote site. Moreover, selection of the one or more RSs may be performed by administrators of the production and/or remote sites.

In Step 402, a consistency group (CG) is generated based on the RS(s) (selected in Step 400). Specifically, in one embodiment of the invention, the CG may be a logical grouping of the one or more RSs, which ensures that updates (i.e., writes) to the source RDM disk are also written to the corresponding replica RDM disk in a consistent and correct write-order. In Step 406, data transfer is enabled for the CG. In one embodiment of the invention, the enablement of data transfer for the CG may refer to commencing the data replication of writes directed to the source RDM disk, thereby obtaining write copies, which may subsequently be distributed to the corresponding replica RDM disk. In other words, enabling of data transfer for the CG activates the data backup and/or archiving process of SVM state and/or data (as virtual machine snapshots) to the remote site for redundant storage and/or disaster recovery purposes.

In Step 406, a SVM write copy is received from a production write splitter (PWS) (see e.g., FIG. 2A) residing at the production site. In one embodiment of the invention, the SVM write copy may be a duplicate of an original SVM write directed to the source RDM disk. Further, the original SVM write may encompass an input-output (IO) operation on the source RDM disk by a SVM (selected into a RS in Step 400). In Step 408, reception of the SVM write copy is acknowledged back to the PWS.

Turning to FIG. 4B, in Step 420, a determination is made as to whether a data protection policy between the production and remote sites is configured for synchronous or asynchronous data replication. Setting of the data protection policy to either of the data replication modes may be configured by administrators of the production and/or remote sites. In one embodiment of the invention, in synchronous data replication, each write (or rather, write copy) that may be received, by way of the PWS, may represent a virtual machine snapshot. In contrast, in asynchronous data replication, multiple write copies, received from the PWS, may be gathered to collectively represent a virtual machine snapshot. Accordingly, if it is determined that the data protection policy is configured for synchronous data replication, then the process proceeds to Step 422. On the other hand, if it is alternatively determined that the data protection policy is configured for asynchronous data replication, then the process alternatively proceeds to Step 424.

In Step 422, after determining (in Step 420) that the data protection policy has been configured for synchronous data replication, a virtual machine snapshot is generated using the SVM write copy (obtained in Step 406). That is, in one embodiment of the invention, the generated virtual machine snapshot may be an image that encompasses just the one SVM write copy. Alternatively, in Step 423, after determining (in Step 420) that the data protection policy has been configured for asynchronous data replication, the SVM write copy (obtained in Step 406) is, instead, stored in a buffer. In one embodiment of the invention, the buffer may be an in-memory data structure or data cache for temporarily storing one or more SVM write copies.

In Step 426, after storing the SVM write copy in the buffer, another determination is made as to whether enough SVM write copies have been stored in the buffer. Specifically, in one embodiment of the invention, a counter value associated with the buffer, which may indicate the number of SVM write copies that may be stored in the buffer, may be compared against a SVM write copy threshold. The SVM write copy threshold may refer to a specified buffer element count, which: (a) when met, indicates that enough SVM write copies have been stored in the buffer; or (b) when not met, indicates that not enough SVM write copies have been stored in the buffer. Furthermore, the SVM write copy threshold may be a preference set by administrators of the production and/or remote sites. Subsequently, if it is determined that enough SVM write copies have been buffered, then the process proceeds to Step 428. On the other hand, if it is alternatively determined that not enough SVM write copies have been buffered, then the process alternatively proceeds (or cycles back) to Step 406 (see e.g., FIG. 4A), where one or more additional SVM write copies are received and eventually buffered until the SVM write copy threshold is met.

In Step 428, after determining (in Step 426) that enough SVM write copies have been buffered (i.e., stored in the above-mentioned buffer), a virtual machine snapshot is generated using the buffered set of SVM write copies. That is, in one embodiment of the invention, the generated virtual machine snapshot may be an image that encompasses the buffered set of two or more SVM write copies. Further, the two or more SVM write copies may be sequenced so as to maintain the write-order consistency in which they had been received and subsequently buffered.

In Step 430, after generation of the virtual machine snapshot (in either Step 422 or 428), a bookmark is applied to the virtual machine snapshot. As described above, in one embodiment of the invention, a bookmark may be a label that enables the virtual machine snapshot to be explicitly referenced during data recovery operations, which may be applied manually or automatically. Further, in applying the bookmark to the virtual machine snapshot, a bookmarked virtual machine snapshot is obtained. In another embodiment of the invention, application of the bookmark may be omitted.

In Step 432, a waiting distribution entry (WDE) for the bookmarked virtual machine snapshot (obtained in Step 430) is generated. In one embodiment of the invention, the WDE (see e.g., FIG. 3B) may be a logical container that specifies at least: a point-in-time associated with the virtual machine snapshot; the virtual machine snapshot itself; the bookmark (if applied in Step 430); a consistency setting (described above); and a consolidation policy (described above).

Turning to FIG. 4C, in Step 440, the WDE (generated in Step 432) is subsequently queued at the top/back/tail of a waiting distribution buffer (WDB) of a production journal volume (PJV). As described above, in one embodiment of the invention, the WDB may be a data structure that resembles a first in, first out (FIFO) queue, wherein one or more virtual machine snapshots await distribution to a remote site. Further, abiding by the FIFO mechanism, each WDE (including the WDE generated in Step 432) traverses and exits the WDB in the order in which the WDE entered the WDB.

In Step 442, the WDE (generated in Step 432) reaches the bottom/front/head of the WDB of the PJV. Specifically, in one embodiment of the invention, after one or more previous WDEs (associated with previous virtual machine snapshots) have reached the bottom of and exited the WDB, the WDE (generated in Step 432) becomes the bottommost element (or entry) in the WDB. Further, upon reaching the bottom of the WDB, the bookmarked virtual machine snapshot, as well as the other metadata, enclosed in the WDE, are obtained. In one embodiment of the invention, reaching the bottom of the WDB may trigger the distribution of the bookmarked virtual machine snapshot to the remote site.

In Step 444, the bookmarked virtual machine snapshot and associated metadata (Obtained in Step 442) are distributed. In one embodiment of the invention, distribution of the bookmarked virtual machine snapshot and associated metadata may entail transmission of the aforementioned objects, through a Fibre Channel (FC) or Internet Protocol (IP) network, to the remote site. Prior to the actual transmission of the aforementioned objects, the distribution process may further entail packaging the aforementioned objects to obtain a transmission package, where the transmission package may subsequently be deduplicated, compressed, and encoded with a Message-Digest (MD) value or checksum used for authenticating the transmission package.

In Step 446, after distributing the bookmarked virtual machine snapshot and associated metadata, an acknowledgement is received from the remote site. In one embodiment of the invention, the acknowledgement may serve as a confirmation that the remote site has received the aforementioned objects, and that re-transmission of the aforementioned objects may not be necessary.

In Step 448, the WDE (generated in Step 432) is repurposed as an already distributed entry (ADE) for the bookmarked virtual machine snapshot. That is, in one embodiment of the invention, the WDE may be relabeled as an ADE. Accordingly, the ADE, like the WDE, may be a logical container that specifies at least: a point-in-time associated with the virtual machine snapshot; the virtual machine snapshot itself; the bookmark (if applied in Step 430); a consistency setting (described above); and a consolidation policy (described above). Thereafter, in Step 450, the ADE (obtained in Step 448) is stored in an already distributed buffer (ADB) residing in the PJV. As described above, in one embodiment of the invention, the ADB may be a data structure that resembles a FIFO queue, wherein one or more virtual machine snapshots are recorded as already having been distributed to the remote site, thereby maintaining a history of the distribution of virtual machine snapshots for SVMs executing at the production site. Moreover, hereinafter, the process proceeds (or cycles back) to Step 406, where additional SVM write copies may be received and eventually distributed.

Figure 5A:
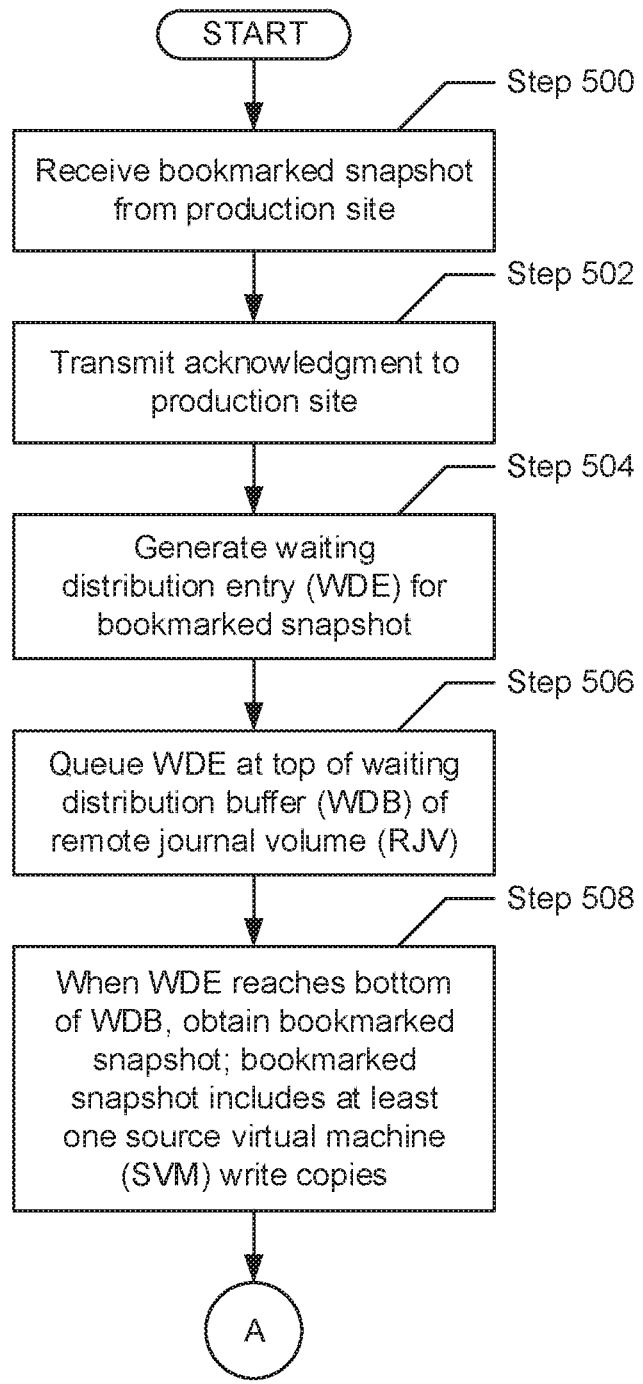
FIGS. 5A and 5B show flowcharts describing a method for protecting replication sets in accordance with one or more embodiments of the invention.
Figure 5B:
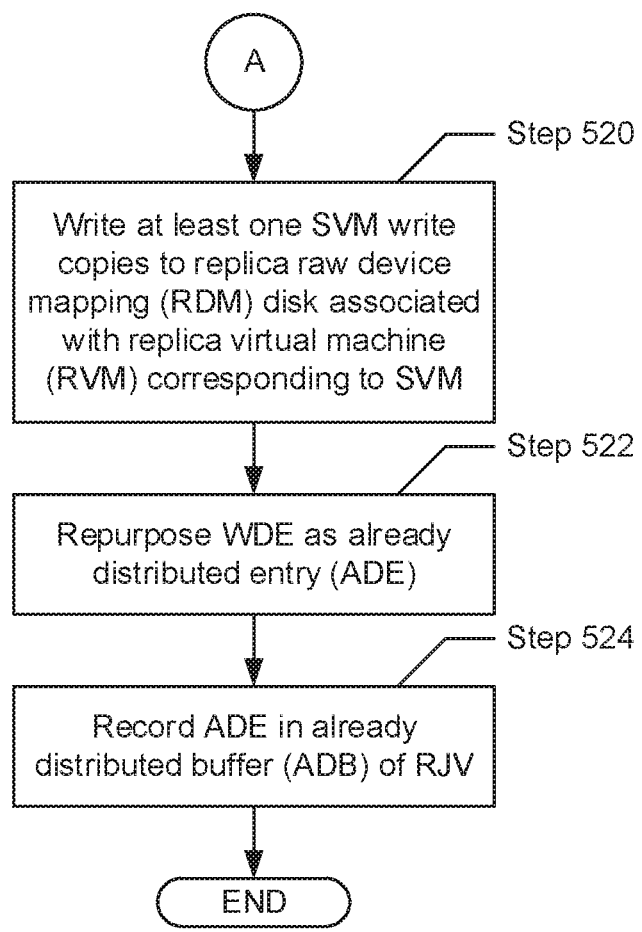

FIGS. 5A and 5B show flowcharts describing a method for protecting replication sets in accordance with one or more embodiments of the invention. The various steps outlined in FIGS. 5A and 5B pertain to the perspective of the remote site. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIGS. 5A and 5B may be performed in parallel with any other steps shown in FIGS. 4A-4C, 6A, and 6B without departing from the scope of the invention.

Turning to FIG. 5A, in Step 500, a bookmarked virtual machine snapshot is received from the production site. In one embodiment of the invention, the bookmarked virtual machine snapshot may have traversed a Fibre Channel (FC) or Internet Protocol (IP) network to arrive at the remote site from the production site. Further, the bookmarked virtual machine snapshot may be accompanied by various metadata associated with the bookmarked virtual machine snapshot, which may include: a point-in-time associated with the virtual machine snapshot; a bookmark (if applied at the production site); a consistency setting (described above); and a consolidation policy (described above). In another embodiment of the invention, a non-bookmarked virtual machine snapshot, which would exclude the bookmark metadata, may alternatively be received. Moreover, in one embodiment of the invention, the aforementioned objects may have been packaged into a transmission package, which may have been deduplicated, compressed, and encoded with a Message-Digest (MD) value or checksum used for authenticating the transmission package.

In Step 502, an acknowledgement, indicating receipt of the bookmarked virtual machine snapshot and associated metadata, is transmitted back to the production site. Specifically, transmission of the acknowledgement may depend on a processing of the received transmission package. More specifically, upon arrival, the transmission package may be verified using the encoded MD value or checksum to ensure that the transmission package was not corrupted in the transmission. In one embodiment of the invention, if the verification process determines that the transmission package has not been corrupted, the transmission of the acknowledgment may proceed. On the other hand, in another embodiment of the invention, if the verification process determines that the transmission package has been corrupted, the transmission of the acknowledgement may not proceed. Furthermore, in the event that the transmission package is not corrupted, the transmission package may be uncompressed and inflated to obtain the enclosed bookmarked virtual machine snapshot and associated metadata therein.

In Step 504, a waiting distribution entry (WDE) for the bookmarked virtual machine snapshot is generated. In one embodiment of the invention, the WDE (see e.g., FIG. 3B) may be a logical container that specifies the bookmarked (or non-bookmarked) virtual machine snapshot and associated metadata (received in Step 500/502). As described in FIGS. 4A-4C above, in one embodiment of the invention, the virtual machine snapshot may encompass a single write copy—i.e., a duplicate of a write—from a source virtual machine (SVM) at the production site to a source raw device mapping (RDM) disk also at the production site. In another embodiment of the invention, the virtual machine snapshot may encompass multiple (i.e., two or more) write copies from a SVM to a source RDM disk, both residing at the production site.

In Step 506, the WDE (generated in Step 504) is subsequently queued at the top/back/tail of a waiting distribution buffer (WDB) of a remote journal volume (RJV). As described above, in one embodiment of the invention, the WDB may be a data structure that resembles a first in, first out (FIFO) queue, wherein one or more virtual machine snapshots await distribution to a replica RDM disk residing at the remote site. Further, abiding by the FIFO mechanism, each WDE (including the WDE generated in Step 504) traverses and exits the WDB in the order in which the WDE entered the WDB.

In Step 508, the WDE (generated in Step 504) reaches the bottom/front/head of the WDB of the RJV. Specifically, in one embodiment of the invention, after one or more previous WDEs (associated with previous virtual machine snapshots) have reached the bottom of and exited the WDB, the WDE (generated in Step 504) becomes the bottommost element (or entry) in the WDB. Further, upon reaching the bottom of the WDB the bookmarked virtual machine snapshot, as well as the other metadata, enclosed in the WDE, are obtained. In one embodiment of the invention, reaching the bottom of the WDB may trigger the distribution of the bookmarked virtual machine snapshot to a replica RDM disk.

Turning to FIG. 5B, in Step 520, the bookmarked (or non-bookmarked) virtual machine snapshot and associated metadata are distributed. In one embodiment of the invention, distribution of the bookmarked (or non-bookmarked) virtual machine snapshot may entail writing of the one or more SVM write copies, encompassed in the virtual machine snapshot, to the replica RDM disk at the remote site. Further, the one or more SVM write copies may be written to the replica RDM disk in the same ordered sequence that the original SVM writes had been performed by the SVM onto a source RDM disk residing at the production site, thereby maintaining write-order consistency between RDM disks at the production and remote sites. Moreover, the replica RDM disk to which the one or more SVM write copies is/are written may be associated with a replica virtual machine (RVM), executing at the remote site, which mirrors the SVM.

In Step 522, the WDE (generated in Step 504) is repurposed as an already distributed entry (ADE) for the bookmarked virtual machine snapshot. That is, in one embodiment of the invention, the WDE may be relabeled as an ADE. Accordingly, the ADE, like the WDE, may be a logical container that specifies at least: a point-in-time associated with the virtual machine snapshot; the virtual machine snapshot itself; the bookmark (if applied at the production site); a consistency setting (described above); and a consolidation policy (described above). Thereafter, in Step 524, the ADE (obtained in Step 522) is stored in an already distributed buffer (ADB) residing in the RJV. As described above, in one embodiment of the invention, the ADB may be a data structure that resembles a FIFO queue, wherein one or more virtual machine snapshots are recorded as already having been distributed to a replica RDM disk, thereby maintaining a history of the distribution of virtual machine snapshots for SVMs executing at the production site.

Figure 6A:
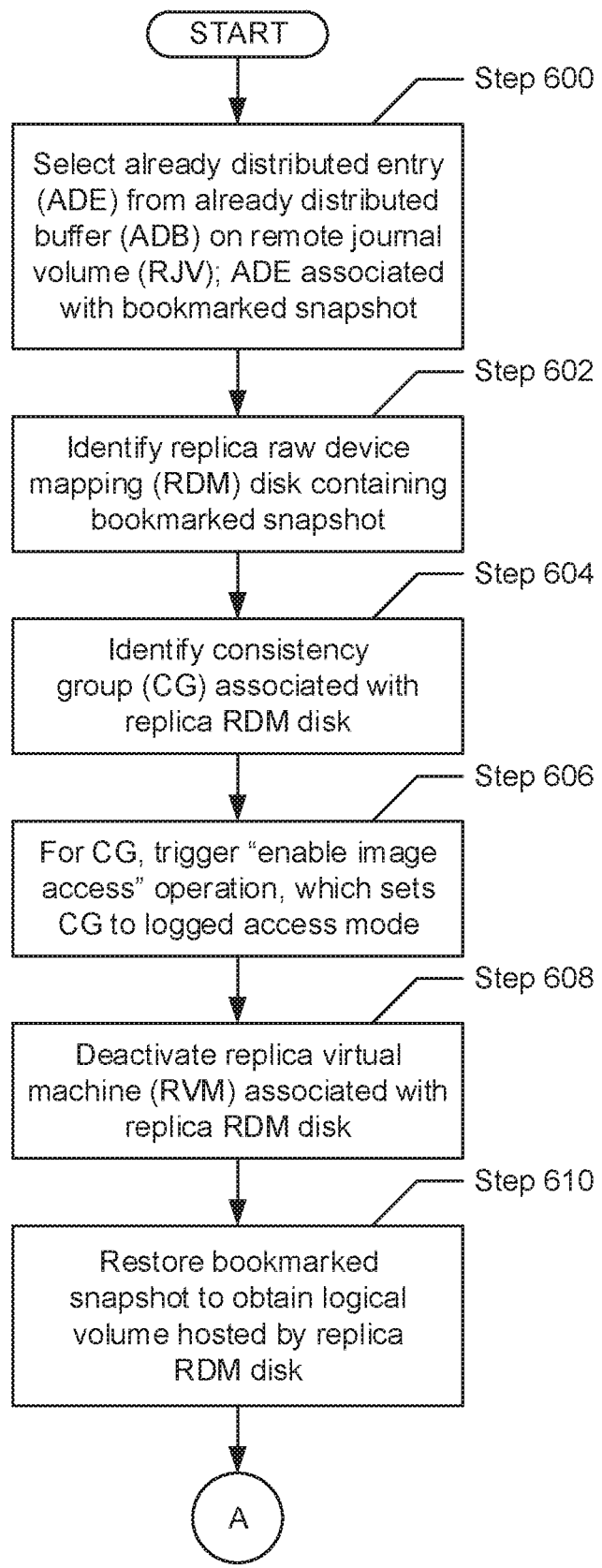
FIGS. 6A and 6B show flowcharts describing a method for enabling data backups for virtual machines reliant on raw device mapping disks in accordance with one or more embodiments of the invention.
Figure 6B:
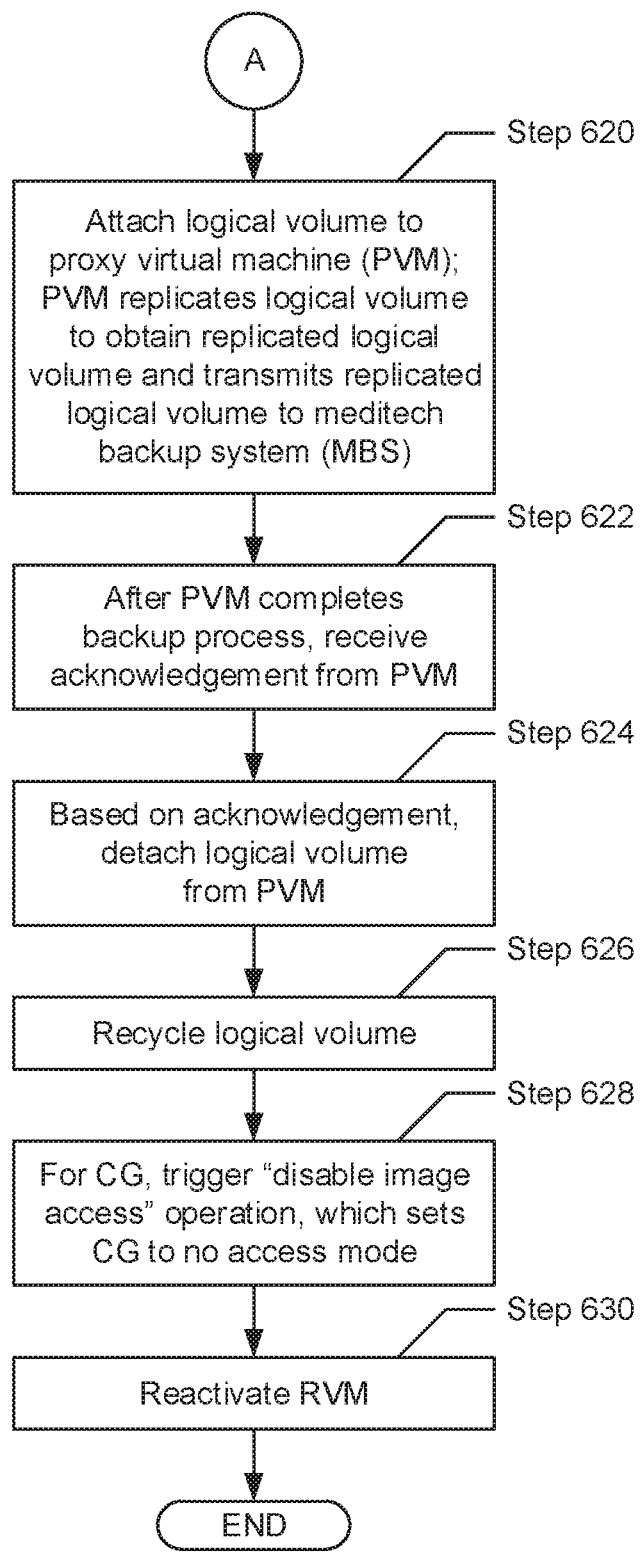

FIGS. 6A and 6B show flowcharts describing a method for enabling data backups for virtual machines reliant on raw device mapping disks in accordance with one or more embodiments of the invention. The various steps outlined in FIGS. 6A and 6B pertain to the perspective of the remote site. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 6A and 6B may be performed in parallel with any other steps shown in FIGS. 4A-5B without departing from the scope of the invention.

Turning to FIG. 6A, in Step 600, an already distributed entry (ADE) is selected from an already distributed buffer (ADB) in a remote journal volume (RJV). In one embodiment of the invention, selection (or rather, obtaining) of the ADE may be triggered by the ADE reaching a bottom/front/head of the ADB after being queued at the top/back/tail of the ADB (see e.g., FIGS. 5A and 5B). Specifically, after one or more previous ADEs have reached the bottom of and exited the ADB, the selected/obtained ADE becomes the bottommost element (or entry) in the ADB. Further, the selected/obtained ADE may be associated with a bookmarked (or non-bookmarked) virtual machine snapshot, which may have already been distributed (or written) to a replica raw device mapping (RDM) disk at the remote site.

In Step 602, the replica RDM disk, to which the bookmarked (or non-bookmarked) virtual machine snapshot had been written, is identified. In one embodiment of the invention, identification of the replica RDM disk may entail accessing an in-memory data structure that may include ADE or virtual machine snapshot to replica RDM disk mappings, which may be populated upon distribution of virtual machine snapshots to respective replica RDM disks.

In Step 604, a consistency group (CG) associated with the replica RDM disk (identified in Step 602) is identified. In one embodiment of the invention, CGs may be logical groupings of one or more replication sets (RSs), where each RS may include a source RDM disk that resides at the production site, and a corresponding replica. RDM disk that resides at the remote site. Identification of the CG may entail accessing an in-memory data structure, shared across both production and remote sites, that may record CG information specifying the RS(s) grouped by each CG defined in the production site and, subsequently, each source and replica RDM disk pair grouped by each RS.

In Step 606, an access mode for the CG (identified in Step 604) is set to a logged-access mode. In one embodiment of the invention, the toggling of the logged-access mode may trigger an "enable image access" operation. An "enable image access" operation may refer to granting host access to the replica RDM disk (identified in Step 602) in order to access the point-in-time image (i.e., bookmarked or non-bookmarked virtual machine snapshot) associated with the ADE (selected/obtained in Step 600). The "enable image access" operation may also pause the distribution of any virtual machine snapshots to any replica RDM disk associated with the CG (identified in Step 604). The virtual machine snapshots may be buffered in the WDB of the RJV until distribution is permitted to resume upon the execution of a "disable image access" operation (described below).

In Step 608, after toggling the logged access mode for the CG (identified in Step 604), a replica virtual machine (RVM) associated with the replica RDM disk (identified in Step 602) is deactivated. More specifically, in one embodiment of the invention, the link between the RVM and the replica RDM disk, both residing at the remote site, may be disconnected or temporarily severed. Thereafter, in Step 610, the bookmarked or non-bookmarked virtual machine snapshot (associated with the ADE selected/obtained in Step 600) is restored. In one embodiment of the invention, restoration of the bookmarked/non-bookmarked virtual machine snapshot may entail recreating the source RDM disk (for the point-in-time associated with the bookmarked/non-bookmarked virtual machine snapshot) as a logical volume. The logical volume may be hosted as an isolated partition in the physical store device constituting the replica RDM disk (identified in Step 602).

Turning to FIG. 6B, in Step 620, the logical volume (obtained in Step 610) is attached to a proxy virtual machine (PVM) executing at the remote site. In one embodiment of the invention, the PVM may be a computer program or process (i.e., an instance of a computer program) tasked with backing up virtual machine snapshots to a third-party storage system such as, for example, a MEDITECH backup system (MBS) (described in FIG. 1). Upon attachment of the logical volume, the PVM may replicate the logical volume to obtain a replicated logical volume; transmit, via a network, the replicated logical volume towards the third-party storage system; and after transmission of the replicated logical volume, submit an acknowledgement back to remote continuous replication agent (CRA), which may be performing the various steps outlined in FIGS. 6A and 6B.

In Step 622, an acknowledgement from the PVM is received indicating that backup operations of the logical volume is complete. In Step 624, based on the acknowledged (received in Step 622), the logical volume (attached in Step 620) is detached from the PVM. Following detachment of the logical volume, in Step 626, the logical volume is recycled. In one embodiment of the invention, recycling of the logical volume may refer to the deletion of the logical volume and the subsequent deallocation of compute and/or storage resources on the remote site that may have been used to recreate the source RDM disk (for the point-in-time associated with the bookmarked/non-bookmarked virtual machine snapshot) as the logical volume.

In Step 628, the access mode for the CG (identified in Step 604) is set to a no-access mode. In one embodiment of the invention, the toggling of the no-access mode may trigger a "disable image access" operation. A "disable image access" operation may refer to forbidding host access to the replica RDM disk (identified in Step 602), thereby pausing the distribution of any virtual machine snapshots to any replica RDM disk associated with the CG (identified in Step 604), which had been paused during the execution of the "enable image access" operation (in Step 606). In Step 630, the RVM associated with the replica. RDM disk (identified in Step 602) is re-activated. More specifically, in one embodiment of the invention, the link between the RVM and the replica RDM disk, both residing at the remote site, may be re-established.

Figure 7:
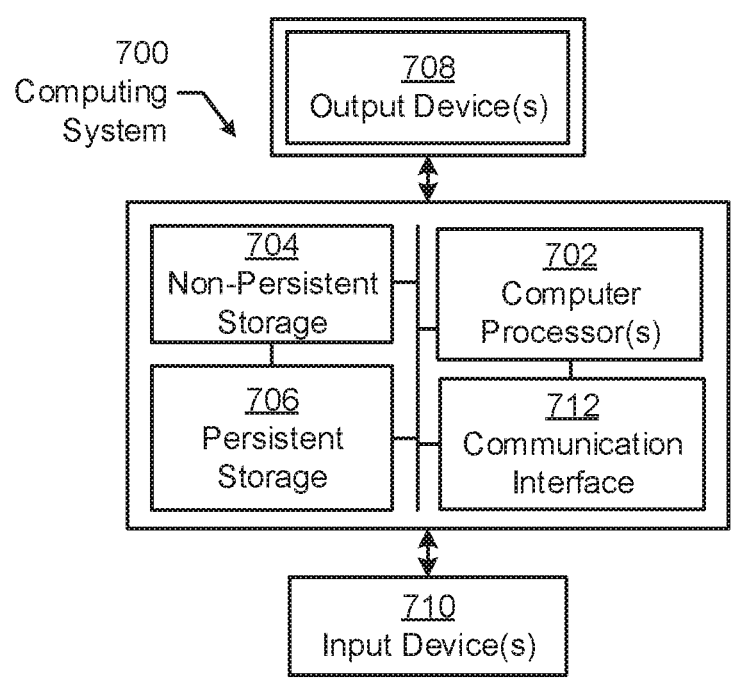
FIG. 7 shows a computing system in accordance with one or more embodiments of the invention.

FIG. 7 shows a computing system in accordance with one or more embodiments of the invention. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one embodiment of the invention, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for backing up virtual machines, comprising:
 selecting, from an already distributed buffer (ADB), an already distributed entry (ADE) comprising a virtual machine snapshot, wherein the ADE is one of a plurality of ADEs that have been distributed and stored in the ADB;
 identifying a replica disk to which the virtual machine snapshot has been distributed, wherein the replica disk is one selected from a group consisting of a raw device mapping (RDM) formatted disk and a virtual machine disk (VMDK) formatted disk;
 identifying a consistency group (CG) comprising at least the replica disk;
 setting an access mode for the CG to a logged-access mode, wherein the logged-access mode suspends distribution and grants access to the CG;
 deactivating a replica virtual machine (RVM) operatively connected to the replica disk;
 restoring the virtual machine snapshot to obtain a logical volume, wherein the logical volume comprises a temporary disk partition to recover written data from the virtual machine snapshot; and
 backing up the logical volume using a proxy virtual machine (PVM).

2. The method of claim 1, wherein the virtual machine snapshot comprises a write copy of a write from a source virtual machine (SVM) to a source RDM disk.

3. The method of claim 2, wherein the RVM is a backup virtual machine for the SVM, wherein the replica disk is a backup disk for the source RDM disk.

4. The method of claim 1, wherein the logical volume is hosted by the replica disk.

5. The method of claim 1, wherein backing up the logical volume using the PVM comprises:
 attaching the logical volume to the PVM;
 instructing the PVM to replicate the logical volume to obtain a replicated logical volume, wherein upon completing replication of the logical volume, the PVM transmits the replicated logical volume to a third-party storage system; and
 detaching the logical volume from the PVM.

6. The method of claim 1, further comprising:
 after backing up the logical volume:
  recycling the logical volume;
  setting the access mode for the CG to a no-access mode; and
  reactivating the RVM operatively connected to the replica disk.

7. The method of claim 1, further comprising:
 prior to selecting, from the ADB, the ADE comprising the virtual machine snapshot:
  receiving the virtual machine snapshot from a production site;
  generating a waiting distribution entry (WDE) using at least the virtual machine snapshot; and queuing the WDE at a top of a waiting distribution buffer (WDB).

8. The method of claim 7, further comprising:
when the WDE reaches a bottom of the WDB after being queued at the top of the WDB:
obtaining the virtual machine snapshot from the WDE;
writing the virtual machine snapshot to the replica disk;
repurposing the WDE as the ADE; and
recording the ADE in the ADB.

9. A system, comprising:
a first computer processor;
a proxy virtual machine (PVM) executing on the first computer processor; and
a remote continuous replication agent (CRA) operatively connected to the PVM, and programmed to:
select, from an already distributed buffer (ADB), an already distributed entry (ADE) comprising a virtual machine snapshot, wherein the ADE is one of a plurality of ADEs that have been distributed and stored in the ADB;
identify a replica disk to which the virtual machine snapshot has been distributed, wherein the replica disk is one selected from a group consisting of a raw device mapping (RDM) formatted disk and a virtual machine disk (VMDK) formatted disk;
identify a consistency group (CG) comprising at least the replica disk;
set an access mode for the CG to a logged-access mode, wherein the logged-access mode suspends distribution and grants access to the CG;
deactivate a replica virtual machine (RVM) operatively connected to the replica disk;
restore the virtual machine snapshot to obtain a logical volume, wherein the logical volume comprises a temporary disk partition to recover written data from the virtual machine snapshot; and
back up the logical volume using the PVM.

10. The system of claim 9, wherein the remote CRA is one selected from a group consisting of a computing appliance comprising a second computer processor and a computer program executing on the first computer processor.

11. The system of claim 9, further comprising:
a third-party storage system operatively connected to the PVM.

12. The system of claim 9, further comprising:
a remote computing system (RCS) comprising the remote CRA, the PVM, and a set of RVMs comprising the RVM.

13. The system of claim 12, further comprising:
a remote storage system (RSS) operatively connected to the RCS and comprising a remote journal volume (RJV) and a set of replica disks,
wherein the RJV comprises the ADB and the set of replica disks comprises the replica disk.

14. The system of claim 9, further comprising:
a production computing system (PCS) comprising a set of source virtual machines (SVMs) and a production CRA,
wherein the RVM is a backup virtual machine for a SVM of the set of SVMs,
wherein the production CRA is operatively connected to the remote CRA.

15. The system of claim 14, further comprising:
a production storage system (PSS) operatively connected to the PCS and comprising a production journal volume (PJV) and a set of source RDM disks,
wherein the replica disk is a backup disk for a source RDM disk of the set of source RDM disks.

16. A non-transitory computer readable medium (CRM) comprising computer readable program code, which when executed by a computer processor, enables the computer processor to:
select, from an already distributed buffer (ADB), an already distributed buffer entry (ADE) comprising a virtual machine snapshot, wherein the ADE is one of a plurality of ADEs that have been distributed and stored in the ADB;
identify a replica disk to which the virtual machine snapshot has been distributed, wherein the replica disk is one selected from a group consisting of a raw device mapping (RDM) formatted disk and a virtual machine disk (VMDK) formatted disk;
identify a consistency group (CG) comprising at least the replica disk;
set an access mode for the CG to a logged-access mode, wherein the logged-access mode suspends distribution and grants access to the CG;
deactivate a replica virtual machine (RVM) operatively connected to the replica disk;
restore the virtual machine snapshot to obtain a logical volume, wherein the logical volume comprises a temporary disk partition to recover written data from the virtual machine snapshot; and
back up the logical volume using a proxy virtual machine (PVM).

17. The non-transitory CRM of claim 16, wherein to back up the logical volume using the PVM, the computer readable program code, which when executed by the computer processor, enables the computer processor to:
attach the logical volume to the PVM;
instruct the PVM to replicate the logical volume to obtain a replicated logical volume, wherein upon completing replication of the logical volume, the PVM transmits the replicated logical volume to a third-party storage system; and
detach the logical volume from the PVM.

18. The non-transitory CRM of claim 16, further comprising computer readable program code, which when executed by the computer processor, enables the computer processor to:
after backing up the logical volume:
recycle the logical volume;
set the access mode for the CG to a no-access mode; and
reactivate the RVM operatively connected to the replica disk.

19. The non-transitory CRM of claim 16, further comprising computer readable program code, which when executed by the computer processor, enables the computer processor to:
prior to selecting, from the ADB, the ADE comprising the virtual machine snapshot:
receive the virtual machine snapshot from a production site;
generate a waiting distribution entry (WDE) using at least the virtual machine snapshot; and
queue the WDE at a top of a waiting distribution buffer (WDB).

20. The non-transitory CRM of claim 19, further comprising computer readable program code, which when executed by the computer processor, enables the computer processor to:

when the WDE reaches a bottom of the WDB after being queued at the top of the WDB:
   obtain the virtual machine snapshot from the WDE;
   write the virtual machine snapshot to the replica disk;
   repurpose the WDE as the ADE; and
   record the ADE in the ADB.

\* \* \* \* \*